United States Patent

[11] 3,583,617

| [72] | Inventor | Shinya Kosaka<br>Tokyo, Japan |
| --- | --- | --- |
| [21] | Appl. No. | 833,494 |
| [22] | Filed | June 16, 1969 |
| [45] | Patented | June 8, 1971 |
| [73] | Assignee | Olympus Optical Co., Ltd.<br>Shibuya-kn, Tokyo, Japan |
| [32] | Priority | Jan. 20, 1966 |
| [33] | | Japan |
| [31] | | 41/2898 |
| | | Continuation-in-part of application Ser. No. 605,373, Dec. 28, 1966, now abandoned. |

[54] DEVICE FOR AUTOMATICALLY STOPPING AND RESTARTING A TAPE FEEDING MECHANISM
6 Claims, 4 Drawing Figs.

[52] U.S. Cl. .................................................. 226/43,
179/100.2, 307/254
[51] Int. Cl. .................................................. B65h 25/32
[50] Field of Search ........................................... 226/24, 33,
42, 43; 200/61.13, 61.14; 307/254, 292;
179/100.2

[56] References Cited
UNITED STATES PATENTS

| 2,952,746 | 9/1960 | Sampson | 179/100.2 |
| 3,126,162 | 3/1964 | Mackenzie | 179/100.2 |
| 3,257,515 | 6/1966 | Nakamatsu | 226/43(X) |

*Primary Examiner*—Richard A. Schacher
*Assistant Examiner*—Gene A. Church
*Attorney*—Kurt Kelman ABSTRACT: Device for automatically stopping and restarting a tape-feeding mechanism in a tape recorder for use with a tape having at least an electrically conductive portion at a predetermined position thereof, the device having a pair of electrically conductive poles which are short circuited by contacting with the electrically conductive portion of the tape as it is fed in the tape recorder so that the motor for driving the tape-feeding mechanism is automatically stopped. The device comprises a switching circuit connected to the electric circuit including the pair of poles, the motor, an electric power source and an electric power supply switch. The switching circuit comprises a main transistor circuit having a first transistor which is so connected in the electric circuit that it is rendered electrically conductive upon closure of the switch when the pair of poles are electrically isolated from each other thereby energizing the motor by the electric power source, but it is rendered nonconductive when the pair of poles are short circuited by the electrically conductive portion of the tape thereby opening the electric circuit so as to deenergize the motor, and an auxiliary transistor circuit having a second transistor with a capacitor connected thereto, the second transistor being so connected in the electric circuit that it is rendered to be electrically conductive for a time period determined by the capacitor upon closure of the switch when the first transistor is in nonconductive condition by the short circuiting of the pair of poles thereby permitting the motor to be energized by the electric power source so that the tape is fed by the tape-feeding mechanism driven by the motor even though the pair of poles are short circuited by the electrically conductive portion of the tape at the starting thereof.

3,583,617

DEVICE FOR AUTOMATICALLY STOPPING AND RESTARTING A TAPE FEEDING MECHANISM

CROSS-REFERENCES TO RELATED APPLICATIONS

The present invention is a continuation-in-part application of U.S. Pat. application Ser. No. 605,373 now abandoned, filed on Dec. 28, 1966 by the same applicant as that of the present application claiming the convention priority based on Japanese Pat. application No. 2898/1966 filed on Jan. 20, 1966.

The above-described U.S. Pat. application Ser. No. 605,373 discloses a device for automatically stopping a tape-feeding mechanism in a tape recorder forming a part of the invention described and claimed in this continuation-in-part application and the benefit of the filing dates of U.S. Ser. No. 605,373 and other application related thereto is claimed in this application.

BACKGROUND OF THE INVENTION

The present invention relates to a device for automatically stopping and restarting a tape-feeding mechanism in a tape recorder.

Heretofore, a device for automatically stopping a tape loaded in a tape recorder has been well known in which the tape is stopped by mechanically disconnecting a part or the entirety of a power-transmitting mechanism connected between a driving motor and a capstan of the tape recorder by means of a signal given by the tape. Alternatively, a device has been known in which a pinch roller and a capstan sandwiching the tape therebetween for feeding the same are mechanically disengaged from each other by means of a signal given by the tape was to stop the feeding thereof.

However, such devices are complicated in construction and require relatively large space in the tape recorder for incorporating same. Therefore, they are not suitable for use in a small-size tape recorder.

Further, a device for automatically stopping a driving motor of a tape-feeding mechanism in a tape recorder has been known in which the electric power supplied to the motor is automatically disconnected by means of a signal given by the tape as the same is being fed so that the tape is stopped.

To this end, for example, a pair of electrically conductive poles are provided in the tape recorder which are spaced a distance and electrically isolated from each other, and they are adapted to contact with the tape when the same is loaded in the tape recorder. At least an electrically conductive portion such as an electrically conductive coating is provided in the tape at a predetermined position in the length thereof so that the pair of poles are short circuited by the electrically conductive portion of the tape when the same comes to a position at which the electrically conductive portion bridges the pair of poles during the feeding of the tape. The signal obtained by the short circuiting of the pair of poles is utilized for operating an electric switching circuit incorporated in the tape recorder so as to deenergize the motor by disconnecting the electric power source from the motor thereby stopping the tape.

Such a device can be made simple in construction and compact in size, particularly, when transistors are used, thus making it suitable for use in a small-size tape recorder.

In such a case, however, since the tape is stopped at a position at which the electrically conductive portion of the tape bridges the pair of poles so that they are short circuited, it is necessary to manually feed the tape until the electrically conductive portion of the tape is disengaged from the pair of poles or to provide additional means for manually operating to disconnect the electric switching circuit from the pair of poles in order to permit the motor to be energized for restarting the tape, thus making it troublesome to operate the tape recorder or making the construction complicated.

The present invention is directed to improvements in the above-described device provided with a pair of electrically conductive poles adapted to be short circuited by the electrically conductive portion of the tape during the feeding thereof so that the motor is deenergized for stopping the tape by the operation of the switching circuit actuated by the short circuiting of the pair of poles.

SUMMARY OF THE INVENTION

An object of the present invention is to provide a novel and useful device for automatically stopping and restarting a tape-feeding mechanism in a tape recorder in which the above-described disadvantages of the prior art are eliminated.

Another object is to provide a novel and useful device of the type described above in which a pair of electrically conductive poles are provided in spaced and mutually electrically isolated relationship from each other, which are short circuited by an electrically conductive portion of a tape loaded in the tape recorder during the feeding thereof thereby actuating an electric switching circuit in the tape recorder connected to the pair of poles so as to deenergize the motor for the tape-feeding mechanism, while the motor can be energized for restarting the tape-feeding mechanism without manually disengaging the electrically conductive portion of the tape from the pair of poles.

The above objects are achieved in accordance with the present invention by a device incorporated in the tape recorder, which is characterized by a switching circuit connected in an electric circuit of the tape recorder including a pair of poles adapted to be short circuited by an electrically conductive portion of the tape during the feeding thereof, a motor for driving the tape-feeding mechanism, an electric power source for energizing the motor and an electric power supply switch, the switching circuit comprising a main transistor circuit having a first transistor which is rendered to be electrically conductive upon closure of the electric power supply switch when the pair of poles are electrically isolated so that the motor is energized to drive the tape-feeding mechanism while it is rendered to be electrically nonconductive when the pair of poles are short circuited by the electrically conductive portion of the tape during the feeding thereof thereby opening the electric circuit so as to deenergize the motor and stop the tape-feeding mechanism, and an auxiliary transistor circuit having a second transistor with a capacitor connected in series thereto, the second transistor being rendered to be electrically conductive for a time period determined by the capacitor connected thereto upon closure of the electric power supply switch when the first transistor is in nonconductive condition by the short circuiting of the pair of poles by means of the electrically conductive portion of the tape thereby energizing the motor so as to drive the tape-feeding mechanism until the electrically conductive portion of the tape is disengaged from the pair of poles so that the first transistor is rendered to be conductive so as to energize the motor by the first transistor, the time period determined by the capacitor being so set that the pair of poles are disengaged from the electrically conductive portion of the tape prior to the expiration of the time period.

Alternatively, the second transistor may be so connected between the first transistor and one of the pair of poles that the first transistor is rendered electrically conductive when the second transistor is in nonconductive condition and vice versa.

A capacitor is connected in parallel to the second transistor so that the same is rendered nonconductive when the current is applied thereto until the capacitor has been charged. Thus, when the pair of poles are in short-circuited condition so as to render the first transistor to be nonconductive, the second transistor is kept in nonconductive condition upon closure of the electric power supply switch until the capacitor is charged so that the first transistor is rendered to be conductive during the time period and the capacitor is being charged even though the pair of poles are short circuited so that the motor is energized to drive the tape-feeding mechanism so as to disengage the pair of poles from the electrically conductive portion of the tape.

In accordance with the present invention, it is not necessary for restarting the tape-feeding mechanism to manually feed the tape so as to disengage the pair of poles from the electrically conductive portion of the tape or to provide additional means for disconnecting the switching circuit from the pair of poles after the motor is deenergized for stopping the tape-feeding mechanism by the short circuiting of the pair of poles by means of the electrically conductive portion of the tape, thereby permitting the tape recorder to be operated with great ease.

Further, since the device of the present invention utilizes transistors and requires no mechanical elements other than the conventional mechanical elements such as the tape-feeding mechanism for driving the tape for the recording, reproducing, quick feeding and rewinding thereof, the tape recorder incorporating the device of the present invention can be made simple in construction and compact in size while the same can be produced at a lower cost.

DETAILED DESCRIPTION OF THE PREFERRED EMBODIMENTS

Figure 1:
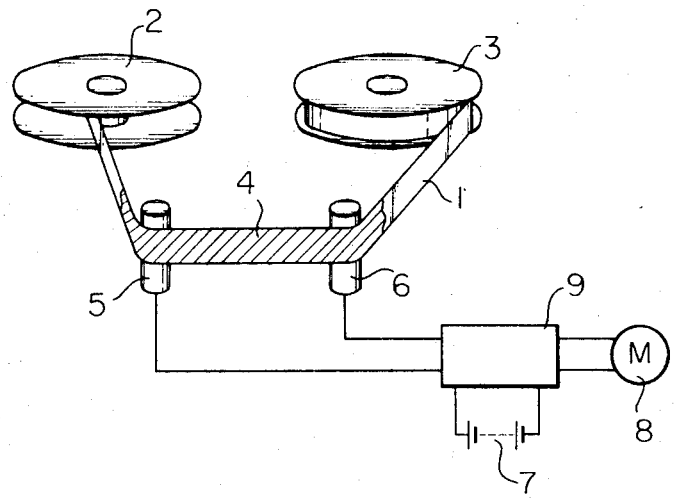
FIG. 1 is a schematic view showing the general construction of the device of the present invention.

In FIG. 1, a tape 1 is shown with its respective ends secured to a pair of reels 2 and 3, respectively, the one serving as a supply reel while the other serves as a takeup reel. At least an electrically conductive portion 4 such as an electrically conductive coating is provided in the tape 1 at a predetermined position in the length of the tape 1 at which it is desired to stop the tape 1.

The pair of reels 2, 3 may be incorporated in a tape cartridge as is well known in the art.

A pair of electrically conductive poles 5, 6 are provided in a tape recorder not shown in the drawing which are spaced an appropriate distance and mutually electrically isolated from each other. In case a tape cartridge housing therein the reels 2, 3 is used, the pair of poles 5, 6 may be provided in the tape cartridge as described later.

The pair of poles 5, 6 are adapted to contact with the tape 1 when the same is loaded in the tape recorder and are short circuited by the electrically conductive portion 4 of the tape 1 when the same comes to a position at which it bridges the pair of poles 5, 6 during the feeding of the tape 1.

An electric power source 7 and a driving motor 8 for driving a tape-feeding mechanism not shown are connected to a switching circuit generally indicated by the reference numeral 9 to which the pair of poles 5, 6 are also connected as shown in the drawing.

The switching circuit 9 is so constructed that the motor 8 is energized by the electric power source 7 upon closure of an electric power supply switch provided in the switching circuit 9 so as to drive the tape-feeding mechanism insofar as the pair of poles 5, 6 are electrically isolated from each other, but the switching circuit 9 is actuated so as to disconnect the motor 8 from the electric power source 7 despite the closure of the electric power supply switch when the tape 1 is fed to a position at which the electrically conductive portion 4 of the tape 1 bridges the pair of poles 5, 6 so that they are short circuited thereby automatically stopping the tape-feeding mechanism.

The electric power supply switch is mechanically coupled with manually operable means not shown for switching the tape-feeding mechanism for the recording, reproducing, quick feeding, or the rewinding of the tape 1 from a neutral position thereof while the rotation of the motor 8 is in the same direction. Each time the manually operable means is operated from one operating position to another operating position, the electric power supply switch is once opened and again closed for the energization of the motor 8 by the electric power source 7 while the electric power supply switch is kept in opened state when the manually operable means is in the neutral position.

As previously described, when a tape cartridge is used, the pair of poles 5, 6 may be incorporated in the cartridge and the pair of poles 5, 6 may be connected to the switching circuit 9 in the tape recorder through connector means, respectively, when the cartridge is loaded in the tape recorder.

Now the first embodiment of the switching circuit of the present invention will be described in connection with FIG. 2.

Figure 2:
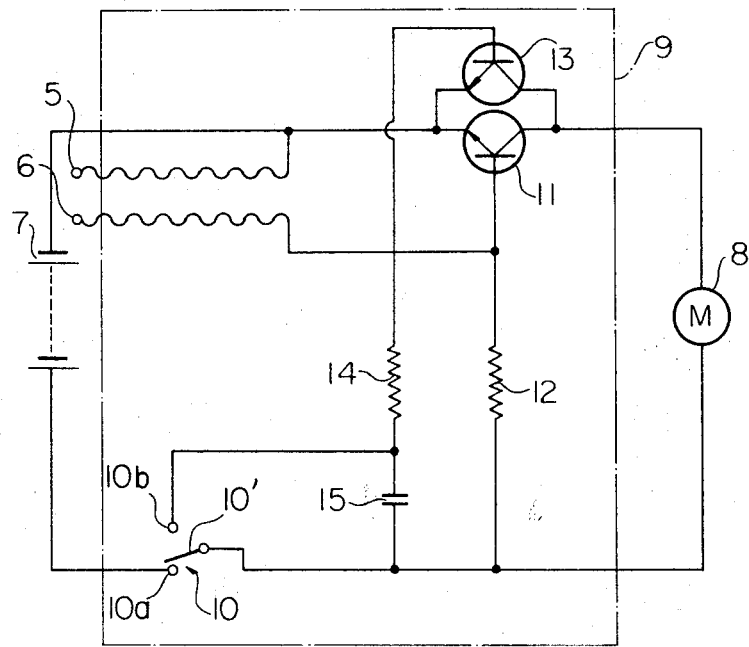
FIG. 2 is a diagram showing the electric circuit of a first embodiment of the present invention.

In FIG. 2, the switching circuit 9 comprises the electric power supply switch 10 having a movable contact 10' and stationary contacts 10a, 10b, a main transistor circuit having a first transistor 11 with a biasing resistor 12 connected in series to the base thereof and an auxiliary transistor circuit having a second transistor 13 with a biasing resistor 14 and a capacitor 15 connected in series to the base thereof.

The collector of the first transistor 11 is connected to one terminal of the motor 8 while the emitter of the first transistor 11 is connected to one terminal of the electric power source 7. The other terminal of the motor 8 is connected to the movable contact 10' of the electric power supply switch 10 while the stationary contact 10a is connected to the other terminal of the electric power source 7. The terminal of the resistor 12 opposite to that connected to the base of the first transistor 11 is connected to the other terminal of the motor 8.

As shown in FIG. 2, the emitter and the collector of the second transistor 13 are connected in parallel to the emitter and the collector of the first transistor 11, respectively, while the terminal of the capacitor 15 opposite to that connected to the resistor 14 which is connected to the base of the second transistor 13 is connected to the other terminal of the motor 8 which is connected to the movable contact 10' of the electric power supply switch 10.

One of the pair of poles 5 is connected to the emitter of the first transistor 11 while the other of the poles 6 is connected to the base of the first transistor 11.

The stationary contact 10b of the electric power supply switch 10 is connected to the joint between the resistor 14 and the capacitor 15 so that the capacitor 15 is discharged when the movable contact 10' contacts with the stationary contact 10b.

As previously described, the electric power supply switch 10 is so actuated that, each time the manually operable means for switching the operation of the tape-feeding mechanism to either of the recording, reproducing, quick feeding or rewinding of the tape from the neutral position thereof is actuated, the movable contact 10' is disengaged from the stationary contact 10a and contacts with the stationary contact 10b and is again contacted with the stationary contact 10a so as to make the electric circuit including the pair of poles 5, 6, the electric power source 7, the motor 8 and the switching circuit 9.

The operation of the switching circuit 9 shown in FIG. 2 is as follows.

When the manually operable means is set in an operating position such as the position for recording the tape so that the movable contact 10' of the electric power supply switch 10 is in contact with the stationary contact 10a after the capacitor 15 is discharged by contacting the movable contact 10' with the stationary contact 10b, a current flows to the base of the first transistor 11 through the biasing resistor 12 so that the first transistor 11 is rendered to be electrically conductive thereby energizing the motor 8 by the electric power source 7, thus the tape-feeding mechanism is driven for the recording of the tape 1. The second transistor 13 is kept in nonconductive condition after the capacitor 15 is charged.

When the electrically conductive portion 4 of the tape 1 comes to a position to bridge the pair of poles 5, 6 during the feeding of the tape 1 so that the pair of poles 5, 6 are short circuited, the difference in the voltage between the base and the emitter of the first transistor 11 becomes zero thereby rendering the first transistor 11 to be nonconductive so that the motor 8 is deenergized to stop the tape-feeding mechanism.

Under such a condition, when the manually operable means is operated to another operating position such as the position for rewinding the tape 1 through the neutral position thereof, the movable contact 10' is moved apart from the stationary contact 10a so as to first contact with the stationary contact 10b thereby discharging the capacitor 15 and then to contact again with the stationary contact 10a thereby making the electric circuit including the pair of poles 5, 6, the electric power source 7, the motor 8 and the switching circuit 9. However, since the pair of poles 5, 6 are short circuited by the electrically conductive portion 4 of the tape 1, the first transistor 11 is in nonconductive condition so that the motor 8 can not be energized by the electric power source 7 through the first transistor 11. In accordance with the characteristic feature of the present invention, the capacitor 15 is provided in the auxiliary transistor circuit having the second transistor 13. Therefore, a current flows to the second transistor 13 through the biasing resistor 14 until the capacitor 15 is charged so that the second transistor 13 is rendered to be conductive during the time period in which the capacitor 15 is being charged thereby energizing the motor 8 by the electric power source 7 through the second transistor 13 so as to drive the tape-feeding mechanism for rewinding the tape 1 even though the pair of poles 5, 6 are short circuited by the electrically conductive portion 4 of the tape 1. By appropriately selecting the capacity of the capacitor 15 and the resistance of the resistor 14 so that the electrically conductive portion 4 of the tape 1 moves out of the engagement thereof with at least one of the pair of poles 5, 6 prior to the expiration of the time period in which the capacitor 15 is charged, the first transistor 11 is rendered to be conductive by the disengagement of the pair of poles 5, 6 from the electrically conductive portion 4 of the tape before the capacitor 15 is charged to render the second transistor 13 to be nonconductive, thus permitting the motor 8 to be continuously energized by the electric power source 7 through the first transistor 11 until another electrically conductive portion, if such is provided, comes to a position bridging the pair of poles 5, 6.

Therefore, if the electrically conductive portion 4 is provided adjacent to each end of a tape 1, then the tape 1 is automatically stopped at either of the ends of the tape 1 in the winding or rewinding operation thereof without requiring the electrically conductive portion 4 of the tape 1 to be manually moved so as to be disengaged from the pair of poles 5, 6 after the tape 1 is automatically stopped by the engagement of the electrically conductive portion 4 with the pair of poles 5, 6.

Any of the reproducing, quick feeding of the tape 1 can be effected in like manner as described above.

Figure 3:
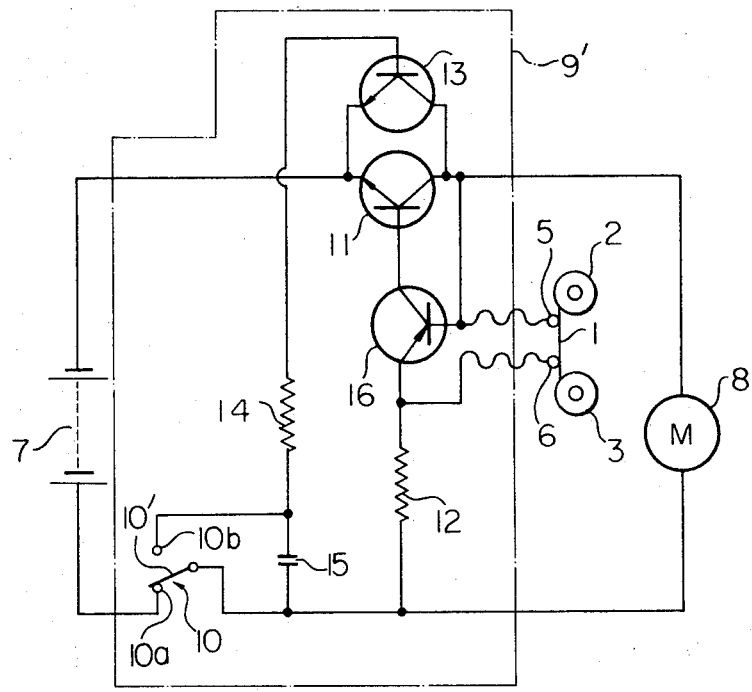
FIG. 3 is a diagram showing a modified form of the electric circuit shown in FIG. 2.

FIG. 3 shows a switching circuit 9' which is a modification of that shown in FIG. 2.

The switching circuit 9' shown in FIG. 3 is similar in construction to that of FIG. 2 except that a third transistor 16 of the opposite characteristics to those of the transistors 11, 13 is interposed between the base of the first transistor 11 and the joint connecting the electrically conductive pole 6 to the base of the first transistor 11 with the base of the third transistor 16 being connected to the electrically conductive pole 5 which is, contrary to that of FIG. 2, connected to the collector of the first transistor 11 connected to the one terminal of the motor 8.

The operation of the switching circuit 9' of FIG. 3 is substantially similar to that of the switching circuit 9 shown in FIG. 2.

As in the case of the embodiment shown in FIG. 2, when the manually operable means is operated for an operating position such as the position for recording the tape 1 so that the stationary contact 10a contacts with the movable contact 10' after the tape 1 is stopped by the short circuiting of the pair of poles 5, 6 by the electrically conductive portion 4 of the tape 1 and the capacitor 15 has been discharged by the engagement of the stationary contact 10b with the movable contact 10' by the operation of the manually operable means, a current flows to the base of the second transistor 13 through the capacitor 15 and the biasing resistor 14 until the capacitor 15 is charged so that the second transistor 13 is rendered to be conductive thereby energizing the motor 8 therethrough by the electric power source 7 during the time period in which the capacitor 15 is charged so as to feed the tape 1 by the tape-feeding mechanism. By appropriately selecting the capacity of the capacitor 15 and the resistance of the resistor 14 so that the electrically conductive portion 4 of the tape 1 is disengaged from at least one of the pair of poles 5, 6 prior to the expiration of the time period in which the capacitor 15 is charged, the first transistor 11 is rendered to be conductive before the capacitor 15 is charged so that the motor 8 is continuingly energized by the electric power source 7 through the first transistor 11 so as to drive the tape-feeding mechanism, because the difference in voltage is generated between the base and the emitter of the third transistor 16 by the disengagement of the pair of poles 5, 6 from the electrically conductive portion 4 of the tape 1 so that the third transistor is rendered to be conductive thereby flowing a current to the base of the first transistor 11 to render the same to be conductive.

When the pair of poles 5, 6 are again short circuited by the electrically conductive portion 4 of the tape 1 during the feeding thereof, the third transistor 16 is rendered to be nonconductive because the difference in voltage between the base and the emitter of the third transistor 16 becomes zero by the short circuiting of the pair of poles 5, 6 thereby rendering the first transistor 11 to be nonconductive, thus deenergizing the motor 8 to stop the tape-feeding mechanism. The second transistor 13 is nonconductive because the capacitor 15 has been charged at the starting of the operation of the tape recorder. The restarting of the tape 1 in either of the feeding and rewinding directions is effected in the same manner as described above.

As previously described, if the electrically conductive portion 4 is provided at each end of the tape 1, it can be stopped at either of the ends thereof.

The embodiment shown in FIG. 3 is preferred in comparison with that shown in FIG. 2, because very little current in the order of several µA flows in the embodiment of FIG. 3 while the pair of poles 5, 6 are short circuited whereas relatively large current in the order of several ma. flows in the embodiment of FIG. 2 during the time the pair of poles 5, 6 are short circuited thus causing relatively large energy loss in the embodiment of FIG. 2 in comparison with that of FIG. 3. Further, the noise is decreased in the embodiment of FIG. 3.

Figure 4:
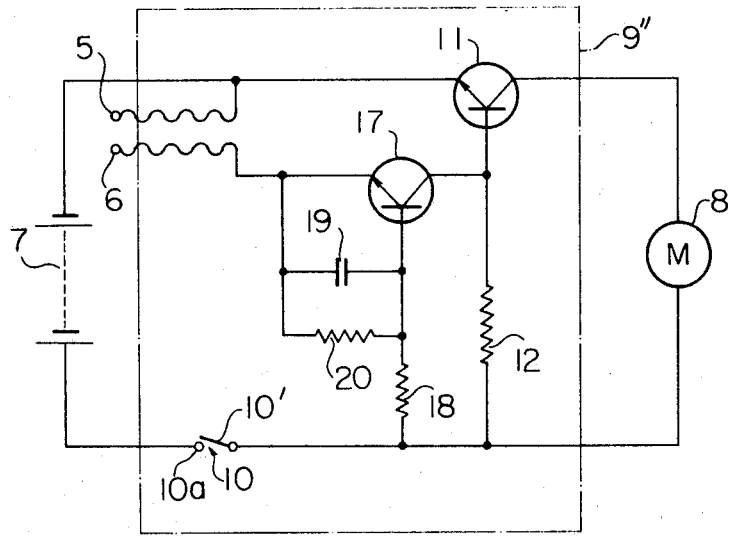
FIG. 4 is a diagram showing the electric circuit of a second embodiment of the present invention.

FIG. 4 shows a second embodiment of the switching circuit 9'' of the present invention.

In this embodiment, the general construction is similar to that of FIG. 2, but the collector of a second transistor 17 is connected to the base of the first transistor 11 and the emitter of the second transistor 17 is connected to the electrically conductive pole 6 while the base of the second transistor 17 is connected to the other terminal of the motor 8 through a biasing resistor 18. In place of the capacitor 15 and the resistor 14 shown in FIG. 2, one terminal of a capacitor 19 is connected to the emitter of the second transistor 17 while the other terminal of the capacitor 19 is connected to the base of the second transistor 17 and a resistor 20 is connected in parallel to the capacitor 19 as shown in FIG. 4.

In the embodiment of FIG. 4, the stationary contact 10b of FIG. 2 is eliminated.

The operation of the embodiment of FIG. 4 is as follows.

When the manually operable means is actuated for an operating position such as the position for recording the tape 1 so that the stationary contact 10a contacts with the movable contact 10' thereby making the electric circuit including the pair of poles 5, 6, the electric power source 7, the motor 8 and the switching circuit 9'', a current first flows to the capacitor 19 if the pair of poles 5, 6 are short circuited by the electrically conductive portion 4 of the tape 1 thereby charging the capacitor 19. During the time period the capacitor 19 is being charged, the second transistor 17 is rendered to be nonconductive because the voltage difference between the emitter and the base of the second transistor 17 is decreased by the current flowing to the capacitor 19 so that the first transistor 11 is rendered to be electrically conductive until the capacitor 19 is charged, because no current flows from the resistor 12 through the second transistor 17 and the current flows to the base of the first transistor 11 through the resistor 12, so that the motor 11 is energized by the electric power source 7 through the first transistor 11 so as to drive the tape feeding mechanism. By appropriately selecting the capacity of the capacitor 19 and the resistance of the resistor 18, the second transistor 17 can be rendered to be nonconductive by the charging of the capacitor 19 so as to render the first transistor to be conductive to drive the tape-feeding mechanism by the motor 8 until the electrically conductive portion 4 of the tape 1 is disengaged from at least one of the pair of poles 5, 6 by the feeding of the tape 1. After the pair of poles 5, 6 are disengaged from the electrically conductive portion 4 of the tape 1, the second transistor 17 is kept in nonconductive condition so that the first transistor 11 is kept conductive so that the motor 8 is continuingly energized by the electric power source 7 to drive the tape-feeding mechanism, while the capacitor 19 is discharged through the resistor 20.

When the pair of poles 5, 6 are again short circuited by the electrically conductive portion 4 of the tape during the feeding of the tape 1, the second transistor 17 is rendered to be conductive after the capacitor 19 is charged thereby rendering the first transistor 11 to be nonconductive so as to deenergize the motor 8 so that the tape-feeding mechanism is stopped.

The electrically conductive portion 4 may be provided at any desired position in the length of the tape 1. However, if the electrically conductive portion 4 is provided at each end of the tape 1, the same can be automatically stopped at either of the ends of the tape 1 and can be restarted the feeding thereof in the opposite direction by merely operating the manually operable means without requiring any manual operation for moving the tape 1 so as to disengage the electrically conductive portion 4 from the pair of poles 5, 6 thereby permitting the operation of the tape recorder to be greatly facilitated.

I claim:

1. Device for automatically stopping and restarting a tape-feeding mechanism in a tape recorder for use with a tape having at least an electrically conductive portion such as an electrically conductive coating applied thereon at a predetermined position in the length of said tape, said device comprising a pair of electrically conductive poles spaced a distance and electrically isolated from each other and adapted to contact with said tape when the same is loaded in said tape recorder so as to be short circuited by said electrically conductive portion of said tape during the feeding thereof, and a switching circuit connected in an electric circuit including said pair of poles, a driving motor for driving said tape-feeding mechanism, an electric power source for energizing said driving motor and an electric power supply switch for opening and closing said electric circuit, said switching circuit being actuated by the short circuiting of said pair of poles so as to open said electric circuit despite the closure of said power supply switch so that said motor is deenergized to stop said tape-feeding mechanism when said tape comes to a position at which said electrically conductive portion thereof bridges said pair of poles, wherein the improvement comprises the fact that said switching circuit comprises a main transistor circuit having a first transistor which is so connected in said electric circuit that it is rendered to be electrically conductive upon closure of said electric power supply switch when said pair of poles are electrically isolated from each other so that said motor is energized by said electric power source while it is rendered to be electrically nonconductive when said pair of poles are short circuited by said electrically conductive portion of said tape during the feeding thereof thereby opening said electric circuit so as to deenergize said motor, and an auxiliary transistor circuit having a second transistor with a capacitor connected in series thereto, said second transistor being so connected in said electric circuit that it is rendered to be electrically conductive for a time period determined by said capacitor upon closure of said electric power supply switch when said first transistor is in nonconductive condition by the short circuiting of said pair of poles by means of said electrically conductive portion of said tape thereby permitting said motor to be energized by said electric power source, said time period determined by said capacitor being so selected that said pair of poles are disengaged from said electrically conductive portion of said tape prior to the expiration of said time period.

2. Device according to claim 1, wherein the collector of said first transistor is connected to one terminal of said motor with the base thereof connected to the other terminal of said motor through a biasing resistor while the emitter of said first transistor is connected to one terminal of said electric power source, said other terminal of said motor being connected to the other terminal of said electric power source through said electric power supply switch, one of said pair of poles being connected to the emitter of said first transistor while the other pole is connected to the base of said first transistor, the emitter and the collector of said second transistor being connected in parallel to the emitter and the collector of said first transistor, respectively, while the base of said second transistor is connected to said other terminal of said motor through a biasing resistor and said capacitor connected in series thereto, a further contact being provided in said electric power supply switch which is connected to the joint between said biasing resistor and said capacitor connected in series to the base of said second transistor so as to form a discharging circuit for said capacitor by the actuation of said electric power supply switch.

3. Device according to claim 1, wherein the collector of said first transistor is connected to one terminal of said motor with the emitter thereof connected to one terminal of said electric power source while the base of said first transistor is connected to the collector of a third transistor, the emitter of which is connected to the other terminal of said motor through a biasing resistor, said other terminal of said motor being connected to the other terminal of said electric power source through said electric power supply switch, the base of said third transistor being connected to the collector of said first transistor, one of said pair of poles being connected to the base of said third transistor while the other pole is connected to the joint between the emitter of said third transistor and said resistor connected thereto, the emitter and the collector of said second transistor being connected in parallel to the emitter and the collector of said first transistor, respectively, while the base of said second transistor is connected to said other terminal of said motor through a biasing resistor and said capacitor connected in series thereto, a further contact being provided in said electric supply switch which is connected to the joint between said biasing resistor and said capacitor connected in series to the base of said second transistor so as to form a discharging circuit for said capacitor by the actuation of said electric power supply switch.

4. Device for automatically stopping and restarting a tape-feeding mechanism in a tape recorder for use with a tape having at least an electrically conductive portion such as an electrically conductive coating applied thereon at a predetermined position in the length of said tape, said device comprising a pair of electrically conductive poles spaced a distance and electrically isolated from each other and adapted to contact with said tape when the same is loaded in said tape recorder so as to short circuit said electrically conductive portion of said tape during the feeding thereof, and a switching circuit connected in an electric circuit including said pair of poles, a driving motor for driving said tape-feeding mechanism, an electric power source for energizing said driving motor and an electric power supply switch for opening and closing said electric circuit, said switching circuit being actuated by the short circuiting of said pair of poles so as to open said electric circuit despite the closure of said power supply switch so that said motor is deenergized to stop said tape-feeding mechanism when said tape comes to a position at which said electrically conductive portion thereof bridges said pair of poles, wherein the improvement comprises the fact that said switching circuit comprises a main transistor circuit having a first transistor the collector of which is connected to one terminal of said motor with the base thereof connected to the other terminal of said motor through a biasing resistor while the emitter of said first transistor is connected to one terminal of said electric power source, said other terminal of said motor being connected to the other terminal of said electric power source through said electric power supply switch, and a second transistor the collector of which is connected to the base of said first transistor while the base thereof is connected to said other terminal of said motor through a biasing resistor, one of said pair of poles being connected to the emitter of said first transistor while the other pole is connected to the emitter of said second transistor, a capacitor and a resistor connected in parallel to each other being arranged with their one terminals connected to the emitter of said second transistor while their other terminals are connected to the base of said second transistor, thereby permitting said first transistor to be rendered electrically conductive upon closure of said electric power supply switch when said pair of poles are electrically isolated from each other so as to energize said motor by said electric power source and to be rendered nonconductive so as to deeneegize said motor when said pair of poles are short circuited by said electrically conductive portion of said tape during the feeding thereof thereby rendering said second transistor to be electrically conductive, while said first transistor is rendered to be electrically conductive upon closure of said electric power supply switch even though said pair of poles are short circuited by said electrically conductive portion of said tape until said capacitor has been charged, the time period for charging said capacitor being selected so that said pair of poles are disengaged from said electrically conductive portion of said tape before said capacitor is charged.

5. Device according to claim 1 wherein said tape is provided with said electrically conductive portion at each end thereof.

6. Device according to claim 4 wherein said tape is provided with said electrically conductive portion at each end thereof.